United States Patent

[11] 3,544,030

[72] Inventor Dennis Daniels
 122 Berkeley Rd., Williamsville, New York 14221
[21] Appl. No. 660,666
[22] Filed Aug. 15, 1967
[45] Patented Dec. 1, 1970

[54] SPINNING REEL
 24 Claims, 3 Drawing Figs.
[52] U.S. Cl. .................................................. 242/84.21,
  43/21, 242/84.1, 242/84.5
[51] Int. Cl. .............................................. A01k 89/00
[50] Field of Search ......................................... 242/84.1(A),
  84.2, 84.2(A), 84.2(D), 84.2(E), 84.2(F),
  84.2(G), 84.2(H), 84.21, 84.21(A); 43/21

[56] References Cited
 UNITED STATES PATENTS
| | | | |
|---|---|---|---|
| 2,658,697 | 11/1953 | Steinbaugh | 242/84.2(A) |
| 2,670,908 | 3/1954 | Hill | 242/84.21 |
| 2,767,935 | 10/1956 | Fowler | 242/84.2(F) |
| 2,852,205 | 9/1958 | Beger | 242/84.21 |
| 2,676,769 | 4/1954 | Sarah | 242/84.21 |
| 3,075,722 | 1/1963 | Stealey et al. | 242/84.2 |
| 3,248,819 | 5/1966 | Stealy | 242/84.1(A)X |
| 3,258,218 | 6/1966 | Stalder | 242/84.21X |

FOREIGN PATENTS
| | | | |
|---|---|---|---|
| 379,371 | 8/1932 | Great Britain | 242/84.21 |

*Primary Examiner*—Billy S. Taylor
*Attorney*—Hill, Sherman, Meroni, Gross & Simpson ABSTRACT: A spinning reel has a spinner which is rotatable and which is axially fixed that carries a retractable bail mechanism, an electric motor operating a rewind mechanism acting on the spinner. A collapsible elastomeric hollow handle within which there is elastomeric foam serves as a source of pressurized fluid which is controlled by a gravity-actuated selector valve to operate one or the other of a pair of fluid actuators. One fluid actuator is connected through a rheostatic motor control to the electric motor for rewinding, and the other actuator is connected to a bail control for retracting the bail. The fluid actuators have a spring acting therebetween which is augmented by a piston.cylinder arrangement carried by such actuators. The line-engaging portion of the bail has a dual curvature along its length.

Patented Dec. 1, 1970 3,544,030
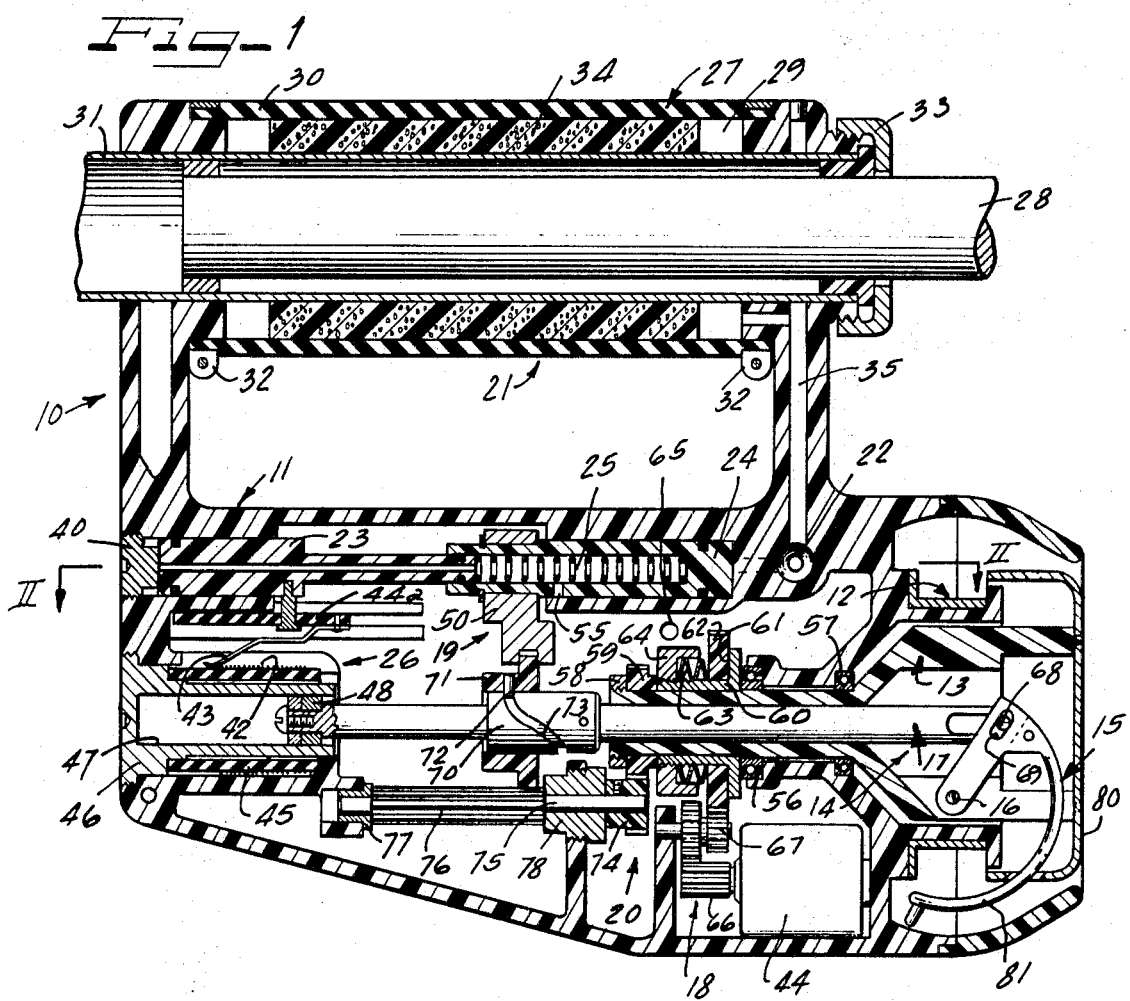
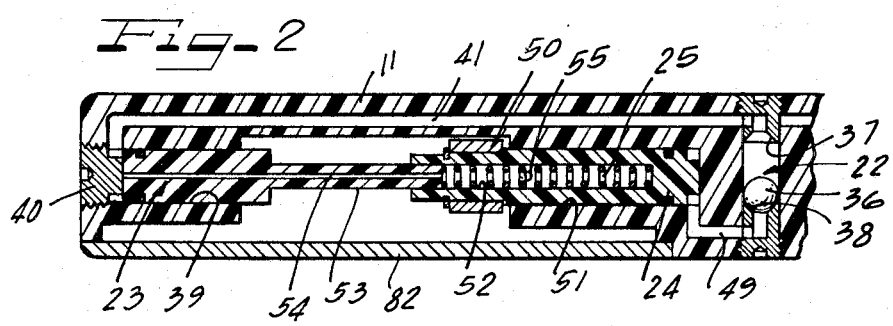
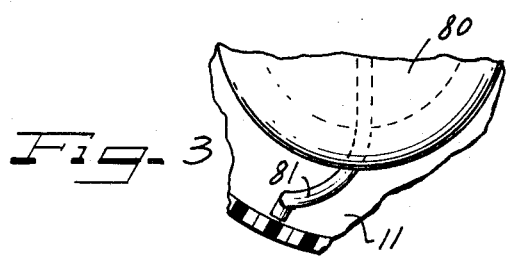
INVENTOR.
DENNIS DANIELS
ATTORNEYS 3,544,030

SPINNING REEL

BACKGROUND

1. Field of the Invention

This invention pertains to a fishing reel, and more particularly to a fishing reel of the spinning type wherein a level-wind feature may be employed.

2. Prior Art

Heretofore, when a fisherman has used a spinning reel, it has been necessary that the apparatus be held by one hand and that such apparatus be operated by the other hand as for rewinding a line or for retracting the bail preparatory to casting. There is a type of fishing contest, known particularly well in Great Britain, wherein the outcome of the contest is in part dependent on the dexterity of the fisherman, such dexterity also extending to incidental functions such as baiting the hook, and giving suitable care to fish that have been caught. During two-handed operation of known spinning reels, it is impractical or impossible for the fisherman to also concurrently select bait, care for fish and the like.

SUMMARY

In accordance with the present invention, I have provided a spinning reel which can be secured to a rod and operated by a single hand of the fisherman. This spinning reel includes a manually controlled source of pressurized fluid connected to a manually positionable selector valve leading to one of two fluid actuators, one actuator being connected to a motor control to regulate operation of a motor-driven rewind mechanism, and the other actuator connected to control bail retraction and extension. The source of pressurized fluid is within the handle and is regulated by squeezing the same. The selector valve is gravity operated so that the attitude of the spinning reel places it in standby condition for either casting or reeling in.

Accordingly, it is an object of the present invention to provide a spinning reel that can be operated and controlled by a single hand.

Another object of the present invention is to provide a power-operated spinning reel.

A still further object of the present invention is to provide an arrangement such that when a fish creates an abnormal tug on the bail during rewind, there is automatically provided a compensating force on the bail to hold it in its normal extended reeling-in position.

Another object of the present invention is to provide a novel spinning reel construction.

Yet another object of the present invention is to provide a spinning reel having a level-wind mechanism preferably constructed so that the pitch or lead per revolution is substantially equal to the line diameter.

Yet another object of the present invention is to provide a level wind mechanism acting on the bail in such a manner that the bail can be retracted for any position of the level-wind mechanism.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

ON THE DRAWINGS

FIG. 1 is a cross-sectional view of a spinning reel provided in accordance with the principles of the present invention;

FIG. 2 is a fragmentary cross-sectional view taken along line II—II of FIG. 1; and FIG. 3 is a fragmentary end view of the bail shown in FIG. 1 with part of the housing broken away.

AS SHOWN ON THE DRAWINGS

The principles of this invention are particularly useful when embodied in a spinning reel of the level-wind type such as that illustrated in FIG. 1, generally indicated by the numeral 10. The spinning reel 10 includes a housing 11 having a fixed spool or line-supporting surface 12, an axially fixed spinner 13 which is rotatably carried on the housing 11 in concentric relation to the spool surface 12, a bail mechanism generally indicated at 14 including a bail 15 pivoted by a pin 16 to the spinner 13 for corotation therewith and a bail shaft 17 slidably guided on the spinner 13 and the housing 11 in concentric relation to the spinner 13 and connected to the bail 15 for corotation therewith. The spinning reel 10 further includes a motor-driven rewind mechanism generally indicated at 18 carried by the housing 11 and drivably connected to the spinner 13. The bail shaft 17 is provided with two types of bail control, one indicated generally at 19 which reciprocates the bail shaft 17 for retracting the bail 15, and the other indicated generally at 20 acting on the bail shaft 17 to effect level winding of the line on the spool surface 12.

For control purposes, the spinning reel 10 is provided with a manually controlled source of pressurized fluid 21 which is connected to a selector valve 22 (FIG. 2) which is connected to a pair of fluid actuators 23, 24 which are biased apart by a return spring 25. The first fluid actuator 23 is connected to a motor control generally indicated at 26 which is operatively connected to the motor-driven rewind mechanism 18, and the second fluid actuator 24 is connected to the bail control 19.

The manually controlled source of pressurized fluid 21 includes a hollow handle 27 which receives an end of a fishing rod or pole 28. By grasping of the handle 27, there is an output pressure that is developed that is substantially proportional to the force of such grasp. To this end, the hollow handle 27 includes an annular chamber 29 the outer portion of which is defined by a tubular piece of rubber 30 or other elastomeric material. The inner surface of the chamber 29 is defined by a section of tubing 31 carried by the housing 11. A pair of clamps 32, 32 hold the ends of the elastomeric member 30 in sealed relation on the housing 11. The housing 11 is clamped to the rod 28 by means of a nut and bushing construction 33. Preferably, within the chamber 29, there is provided an annular elastomeric foam member 34 which yieldably opposes collapse of the elastomeric member 30. By applying a grasping force to the hollow handle 27, a fluid, such as air, which is contained therein is urged outwardly through a passage 35 to the selector valve 22.

The selector valve 22 is manually positionable, and in this embodiment comprises a gravity-actuated valve having a ball 36 sealably engageable with one of a pair of confronting valve seats 37, 38. By tilting of the spinning reel 10 slightly to one side or the other, the ball 36 rolls to block or check one of the seats 37, 38, thereby leaving the unblocked seat and the structure associated therewith in a standby condition for receiving pressurized fluid.

The fluid actuator 23 has a major diameter in the form of a piston which is slidably guided in a cylinder bore 39 provided in the housing 11. The retracted position of the fluid actuator 23 is determined by the spring 25, but can be adjusted by selective positioning of an adjustment member 40 which not only alters the preload on the return spring 25, but also alters the initial setting of the motor control 26. With the ball 36 of the selector valve 22 blocking the seat 38, pressurized fluid may flow through the open seat 37, through a passage 41, and thence to the fluid actuator 23 to displace it from its retracted position by an amount proportional to the pressure applied.

In this embodiment, the motor control 26 comprises a rheostat having a resistance wire portion 42 engaged by a wiper 43. The wiper 43 is carried by an insulative slider 44a that is guided by tracks on the housing 11, the slider 44a being mechanically connected to the fluid actuator 23. The return spring 25 thus also serves to hold the motor control 26 in its retracted position. The rheostat of such motor control 26 is connected in electrical circuit with an electrical motor 44 forming part of the motor-driven rewind mechanism 18 and a suitable battery or other electrical power supply (not shown) preferably disposed in one of the cavities or voids in the housing 11. Thus the wiper 43 also serves as an on-off switch for the motor 44, and as the wiper 43 moves further to the right, as shown, more power is delivered to the motor 44. As the tug exerted by a fish increases, a correspondingly increasing reactive force is provided by the fisherman to the handle portion 27, whereby the grip is increased in force, whereby further power is delivered to the electrical motor 44 as needed.

The rheostat 42, 43 is carried on an insulative sleeve 45 which is clamped within a housing recess by means of a threaded bushing 46, the bushing 46 being thus secured to the housing 11 and forming a functional part thereof. Preferably, the bushing 46 has an internal bore 47 which provides guidance for the end of the bail shaft 17 which is remote from the bail 15. To this end, suitable slide bearing members 48 are carried by the bail shaft 17 within the bore 47.

In a similar manner, the selector valve 22 communicates through the seat 38 and a further passage 49 with the second fluid actuator 24. As the pressure on the fluid actuator 24 is increased, it shifts against the force of the return spring 25 and carries along with it a bail control block 50 which is held thereon by means of a snap ring. The fluid actuator 24 likewise has a major diameter in the nature of a piston slidably carried in a cylinder bore 51 in the housing 11. The return spring 25 thus also serves to hold the bail control block 50 in a retracted position as shown.

One of the fluid actuators 24 has a cylindrical bore 52 which holds the return spring 25, and the other fluid actuator 23 has a piston portion 53 received in the cylindrical bore 52. On movement of the piston portion 53 of the fluid actuator 23 into its cylinder 52, the fluid such as air, therein is compressed, such compressed fluid serving to supplement the force of the spring 25. A further fluid passage 54 is pressurized from the selector valve 22 along with the first actuator 23, and in this embodiment comprises a bore extending axially through the fluid actuator 23 and the piston portion 53 to the cylinder bore or chamber 52 so that on pressurization of the fluid actuator 23, for rewinding the actuator 24 is further positively held in its retracted position. Thus, the force of the return spring 25 is further supplemented in a positive manner to hold the bail control block 50 in the position illustrated. In the event that a fish should provide an abnormally heavy tug through the line so as to attempt to rock the bail 15 to a retracted position, such force would be reacted to by the grip of the fisherman who thereby provides additional fluid pressure to the cylinder bore 52, thereby automatically compensating for such force.

The fluid actuator 24 has a normally closed vent port 55 extending from the cylinder bore 52 radially therethrough. The vent port 55 is normally closed in that it is disposed within the cylinder bore 51 when the fluid actuator 24 is in a retracted position. However, when the actuator 24 is displaced from its retracted position, after a small amount of preliminary movement the vent port 55 is unblocked, whereby the cylinder bore 52 is vented to the interior of the housing 11 which is at atmospheric pressure. Thus, the arrangement described comprises means to open the port 55 in response to movement of the second actuator 24 away from its retracted position.

From the foregoing description, it is seen that either the motor control 26 or the bail control block 50 is reciprocated against the force of the return spring 25 by means of squeezing on the handle, only one of these elements in fact being reciprocated, and the selection of that one being under the control of the selector valve 22.

The spinner 13 is supported by a pair of thrust bearings 56, 57 for rotation, a nut 58 being threaded on the inner end of the spinner 13 and acting axially through a gear 59 and a bushing 60 for drawing the bearings 56, 57 toward each other. The bushing 60 has a flange with an annular surface 61 which is axially engaged by a gear 62 which is held thereagainst by means of a set of Belleville washers 63 which are compressed a selected amount by means of a nut 64 threaded on the bushing 60. The housing 11 has an aperture 65 for receiving therethrough a tool for adjusting the nut 64, and hence for adjusting the force needed to slip the gear 62 with respect to the bushing 61. The motor 44 has a pinion 66 which acts through stepdown gearing 67 on the gear 62 for rotating the spinner 13 with an input torque that is limited by the position of the nut 64.

As the pin 16 is carried by the spinner for pivotally supporting the bail 15, rotation of the spinner 13 also rotates the bail 15 about the same axis. The bail shaft 17 has a pin 68 projecting from a flat surface of the bail shaft 17 into a slot 69 in the bail 15, and because of this connection, the bail shaft 17 is also corotatable with the spinner 13. However, the bail shaft 17 is slidably supported by the spinner 13, and preferably also by the housing 11. By suitable control of the axial position of the bail shaft 17, there is provided both bail retraction and level winding. To this end, there is a sleeve 70 which is pinned to the 17 shaft 11 while a gear 71 is slidably fitted on the sleeve 70. Between the gear 71 and the sleeve 70, there is provided a pin and helical-slot connection, the pin being indicated at 72 and the helical slot at 73. The gear 71 has a portion, here the toothed portion, which is trapped between shoulders on the bail control block 50 so that the gear 71 is normally restrained in an axial direction to a position as shown due to the influence of the return spring 25. However, the gear 71 is free to rotate through such restraining shoulders and with respect to the sleeve 70. The gear 59 which is corotatably carried on the spinner 13 meshes with a step-up gear 74 secured to the stub end 75 of a further gear 76 which meshes with the gear 71 in a stepdown manner. The respective degrees of step-up and stepdown are slightly different so that the gear 71 is rotated at a speed slightly different from that of the gear 59. By way of specific example, the gear 59 may have 62 teeth, the gear 74 may have 18 teeth, the gear 76 may have 20 teeth and the gear 71 may have 60 teeth. Thus with a slight difference in speed between the gears 58 and 71 which otherwise would be rotating together, the gear 71 rotates slightly with respect to the sleeve 70. However, owing to the fact that the gear 71 is axially restrained, such relative movement because of the effect of the pin and helical groove connection 72, 73, causes the bail control shaft to move axially in accordance with the shape of the groove 73. This structure produces an exceedingly fine rate of bail feed or level-winding and preferably the result is such that successive turns of line are laid on the spool support surface 12 in tangent relation to each other so that a single layer of line can be laid with virtually no space between consecutive turns or loops, and with an absolute minimum of overlying turns or loops. No matter at what point in a cycle the level-wind mechanism may be disposed, the bail control 50 may be shifted from its retracted position. Thus the bail control block 50 through its shoulders grasps the gear 71 which acting through the pin 72 and the groove 73 of the sleeve 70 causes the bail control shaft 17 to shift, to the left as drawn, thereby retracting the bail 15 to ready the spinning reel 15 for casting or other paying out of line. The gear 76 is elongated so that the gear 71 stays in mesh with it during such shifting action. Opposite ends of the gear 76 are carried by a pair of bearings 77, 78 secured to the housing 11.

The bail 15 has a line guiding portion which can extend out of a spinner cap 80 as illustrated in FIGS. 1 and 3. As viewed from the side, the line guiding portion constitutes a portion 81 which has a curvature about the pivotal axis of the pin 16, while this same portion 81, which projects out of the spinner cover 80, has a further or superimposed curvature shown in FIG. 3 which extends about an axis generally parallel to the rotational axis of the spinner. This type of bail construction enables the bail to pick up the line smoothly which then rides on the convex surface shown in FIG. 3, passes over such surface, and catches on a hook portion on the end thereof.

The fluid actuators 23, 24, and the bail mechanism 14 normally take the position illustrated of themselves so that when no action is needed, there will be neither rewinding nor paying out of the line. By application of torque to the gear 62, as by energizing of the motor 44, rewinding commences. Such rewinding can be terminated at will. Such rewinding also effects gradual reciprocation of the bail shaft 17 by an amount corresponding to the width of the support surface 12, thereby effecting level winding of the line. However, on major shifting of the bail control shaft 17 by means of the control block 50, the bail 15 disengages the line and retracts into the spinner cover or cap 80 to permit the line to be payed out freely.

The housing 11 is closed by a cover 82.

Although various minor modifications might be suggested by those versed in the art, it should be understood that I wish to embody within the scope of the patent warranted hereon all such embodiments as reasonably and properly come within the scope of my contribution to the art.

I claim:

1. A spinning reel comprising:
   a. a manually controlled source of pressurized fluid;
   b. a pair of fluid actuators;
   c. a manually positionable selector valve arranged to connect said source to a selected one of said fluid actuators;
   d. a motor-driven rewind mechanism;
   e. a motor control operated by a first of said fluid actuators and operatively connected to the motor of said rewind mechanism;
   f. a normally extended bail mechanism; and
   g. a bail control operated by a second of said fluid actuators and connected to said bail mechanism to effect retraction thereof.

2. A spinning reel according to claim 1, in which said source of pressurized fluid is arranged as a hollow handle for receiving a fishing rod.

3. A spinning reel according to claim 1, in which said source of pressurized fluid comprises means arranged to be manually grasped and to provide an output pressure which is substantially proportional to the force by which it is grasped for proportionately displacing at least one of said fluid actuators.

4. A spinning reel according to claim 1, in which said source of pressurized fluid comprises a collapsible elastomeric handle having a chamber therein connected to said selector valve.

5. A spinning reel according to claim 4, which includes a quantity of elastomeric foam at least partially filling said chamber and yieldably opposing collapse of said handle.

6. A spinning reel according to claim 1, in which said selector valve is gravity actuated, whereby the spinning reel may be placed in standby condition for the selected one of the alternatives of rewinding and casting in response to its attitude.

7. A spinning reel according to claim 1, which includes a return spring acting between said pair of fluid actuators and urging both of said actuators toward their retracted positions.

8. A spinning reel according to claim 7, in which said return spring also urges said motor control to a "motor-off" position.

9. A spinning reel according to claim 7, in which said return spring, in acting on said second fluid actuator, also urges said bail control to hold the bail mechanism positively in its extended position.

10. A spinning reel according to claim 7, which includes an adjustment member for engaging one of said fluid actuators to define its retracted position and to provide an adjustable preload on said return spring.

11. A spinning reel according to claim 7, in which one of said actuators has a cylinder bore within which said return spring is disposed, the other of said actuators having a piston slidably disposed in said cylinder bore to act compressively on fluid trapped therein for supplementing the force of said return spring.

12. A spinning reel according to claim 11, which includes a fluid passage arranged to receive pressurized fluid from said selector valve along with said first fluid actuator, and to conduct such pressurized fluid to said cylinder bore to augment the fluid trapped therein.

13. A spinning reel according to claim 11, in which said one of said actuators has a normally closed vent port leading to said cylinder bore, and means for opening said vent port in response to movement of said second fluid actuator away from its retracted position.

14. A spinning reel according to claim 1, in which said source of pressurized fluid comprises means arranged to provide an output pressure which is variable for displacing at least said first of said fluid actuators by a corresponding amount, the motor of said rewind mechanism being electric, and said motor control being a rheostat having a wiper positioned by said first fluid actuator to thereby provide rewinding corresponding to said variable output pressure.

15. A spinning reel according to claim 1, in which said rewind and bail mechanisms include:
   a. a fixed spool surface for receiving a line;
   b. a spinner rotatably supported in an axially fixed position concentrically within said spool surface;
   c. a bail pivotally mounted on said spinner for corotation and having a line guiding portion normally overlying said fixed spool surface;
   d. a bail shaft slidably mounted concentrically with said spinner and connected to said bail for retracting it from said fixed spool surface by axial sliding movement;
   e. a motor geared to said spinner to rotate it; and
   f. means connecting said bail control to said bail shaft to reciprocate it.

16. A spinning reel according to claim 15 in which the gearing between said motor and said spinner includes:
   a. a driven gear encircling the spinner;
   b. an axially adjustable nut encircling the spinner; and
   c. spring means urged by said nut against said driven gear, and biasing said driven gear against an annular surface on said spinner.

17. A spinning reel according to claim 15 which includes means driven by said spinner and connected to said bail shaft for gradually reciprocating said shaft to effect level winding of the line on said spool support surface.

18. A spinning reel according to claim 17 in which said bail shaft is corotatable with said spinner, wherein said means for gradually reciprocating said shaft comprises:
   a. a gear supported on said bail shaft, and normally restrained by said bail control from moving axially;
   b. a pin and helical groove connection between said gear and said bail shaft; and
   c. gearing driven by said spinner and connected to said bail shaft gear for rotating it at a slightly different speed from that of said spinner.

19. A spinning reel comprising:
   a. a housing having a fixed nonrotatable spool surface for receiving a line;
   b. a spinner rotatably supported in an axially fixed position on said housing and having a portion disposed concentrically within said spool surface;
   c. a bail pivotally mounted on said spinner for corotation and having a line-guiding portion normally overlying said fixed spool surface;
   d. a bail shaft slidably mounted concentrically with said spinner and connected to said bail for rotation therewith and for retracting it from said fixed spool surface by axial sliding movement;
   e. means carried by said housing and geared to said spinner to rotate it; and
   f. means secured to said housing and connected to said bail shaft for reciprocating it.

20. A spinning reel according to claim 19 in which the gearing includes:
   a. a driven gear encircling the spinner;
   b. an axially adjustable nut encircling the spinner; and
   c. spring means urged by said nut against said driven gear, and biasing said driven gear against an annular surface on said spinner, said housing having an access aperture adjacent to said nut.

21. A spinning reel according to claim 19, in which said reciprocating means connected to said bail shaft includes:
 a. means secured to said housing for gradually reciprocating said shaft to effect level winding of the line on said spool surface; and
 b. means secured to said housing for rapidly reciprocating said shaft a large amount to effect said retraction and the return of said bail.

22. A spinning reel according to claim 19, in which said bail shaft is corotatable with said spinner, and in which said reciprocating means for said bail shaft includes:
 a. a gear supported on said bail shaft;
 b. a pin and helical groove connection between said gear and said bail shaft;
 c. means restraining said gear from moving axially; and
 d. gearing driven by said spinner and connected to said bail shaft gear for rotating it at a slightly different speed than that of said spinner to effect a level winding of the line on said spool surface.

23. A spinning reel according to claim 22, in which said axial restraining means for said bail shaft gear is normally disposed in a retracted position to effect said level winding, and is movable by a control to an extended position to shift said bail shaft axially at any relative position of said pin and helical groove connection to effect said retraction of said bail.

24. A spinning reel according to claim 19 in which said bail has its pivotal mount disposed axially within the space encircled by said spool surface.